(12) United States Patent
Cuffaro

(10) Patent No.: US 6,223,032 B1
(45) Date of Patent: Apr. 24, 2001

(54) MISBEHAVING MOBILE STATION IDENTIFICATION SYSTEM AND METHOD, AND A MOBILE STATION FOR USE THEREWITH

(75) Inventor: Angelo Cuffaro, Pierrefonds (CA)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/031,783

(22) Filed: Feb. 27, 1998

(51) Int. Cl.[7] .................................................. H04Q 7/20
(52) U.S. Cl. .................. 455/425; 455/67.1; 455/67.3; 455/575; 455/422
(58) Field of Search ........................ 455/423, 425, 455/67.1, 67.3, 67.7, 9, 8, 575, 550, 422

(56) References Cited

U.S. PATENT DOCUMENTS

| | | |
|---|---|---|
| 5,105,458 | 4/1992 | Takenaka . |
| 5,425,076 | 6/1995 | Knippelmier . |
| 5,457,737 | 10/1995 | Wen . |
| 5,487,071 | 1/1996 | Nordstrand et al. . |
| 5,542,120 * | 7/1996 | Smith et al. .................. 455/425 |
| 5,706,333 | 1/1998 | Grenning et al. . |
| 5,812,636 * | 9/1998 | Tseng et al. .................. 455/425 |
| 5,839,058 | 11/1998 | Phillips et al. . |
| 5,898,921 * | 4/1999 | Liinamaa et al. .............. 455/425 |
| 5,933,776 * | 8/1999 | Kirkpatrick .................... 455/67.1 |

OTHER PUBLICATIONS

Kall, et al. "Maintenance Information in the GSM System"; Jun. 1987 International Conference on Digital Land Mobile Radio Communications; pp. 497–506.

PCT International Search Report; Jun. 11, 1999; PCT/SE99/00183.

* cited by examiner

*Primary Examiner*—Doris H. To
(74) *Attorney, Agent, or Firm*—Jenkens & Gilchrist

(57) ABSTRACT

Malfunctioning or misbehaving mobile stations, that are capable nonetheless of continuing to communicate with a wireless communication system, are detected for the purposes of either shutting down misbehaving mobile stations or reporting misbehaving mobile stations so that corrective action can be taken. An error detector and interpreter detects in wireless communication signals received from a mobile station any breach of protocol errors indicative of faulty operation of the mobile station. A misbehavior analyzer analyzes the errors over time to determine whether the mobile station is misbehaving. Normal access of the mobile station to the wireless communication system is shut down or a message is sent to the subscriber in the event the mobile station is determined to be misbehaving. The mobile station also has a shutdown mode of operation, controllable by a message sent from the network, in which the mobile station remains idle and non-functional until repaired. The quality of service to subscribers using the wireless communication system is thus improved.

24 Claims, 2 Drawing Sheets

US 6,223,032 B1

MISBEHAVING MOBILE STATION IDENTIFICATION SYSTEM AND METHOD, AND A MOBILE STATION FOR USE THEREWITH

FIELD OF THE INVENTION

The present invention relates to a wireless communications system which detects the misbehavior or improper functioning of a mobile station. The present invention also relates to a mobile station having a remotely activated shutdown mechanism for the purposes of remotely shutting the mobile station down when misbehavior is detected.

BACKGROUND OF THE INVENTION

It is known in the art of wireless communications in which mobile stations access a wireless system including one or more base stations, and in the case of cellular telephony an array of base stations arranged in cells, to shut down or end wireless communications with a given mobile station when signal strength becomes too weak. This routine is part of controlling wireless communications in the system. It is also known to provide, as a security feature, an automatic shutdown of communications with a mobile station when the authenticity of the mobile station's identification response code is doubted. Security control is an important feature to prevent fraudulent use of subscriber accounts, and to prevent fraudulent access to otherwise secure communications systems.

It has been discovered that some mobile stations are fully capable of transmitting and receiving with sufficient signal strength, and are able to provide acceptable identification codes to the wireless system in order to register and continue having access to the wireless system, even though such mobile stations fail to communicate according to an expected quality standard respecting the wireless communications protocols used in the system. Failure to operate according to protocol adversely affects the quality and reliability of the communication with the misbehaving mobile station, and consequently is a disturbance to the subscriber using the mobile station and/or to neighboring mobile station subscribers. Furthermore, the wireless system is taxed by having to manage the misbehaving mobile station which decreases the system's efficiency in providing reliable service to all subscribers.

SUMMARY OF THE INVENTION

It is a primary object of the present invention to provide an improved wireless communications system in which malfunctioning or misbehaving mobile stations, that are capable nonetheless of continuing to communicate, are detected for the purposes of either shutting down misbehaving mobile stations or reporting misbehaving mobile stations so that corrective action can be taken in order to improve the quality of service to subscribers using the wireless communications system.

According to the invention, there is provided a misbehaving mobile station identification system in a wireless communication system, the identification system comprising error detection means for detecting, in wireless communication signals received from a mobile station, errors indicative of faulty operation of the mobile station and for generating error signals, and means for analyzing the error signals to determine whether the mobile station is misbehaving and to output a misbehaving identification signal identifying the mobile station as misbehaving if the mobile station is determined to be misbehaving.

Preferably, the identification system according to the invention also comprises operator notification means for providing an operator at least periodically with a display of the identification. In addition, the system also comprises mobile station notification means for providing a subscriber using said mobile station with a message in response to said identification signal.

BRIEF DESCRIPTION OF THE DRAWINGS

The invention will be better understood by way of the following description of a preferred embodiment of the invention with reference to the appended drawings, in which.

DETAILED DESCRIPTION OF THE PREFERRED EMBODIMENT

Some of the ways in which a mobile station may fail to communicate according to protocol or standard and thus misbehave are listed as follows. A mobile station may violate the standard it was designed for, as for example by performing a registration indiscriminately and not respecting the rules outlined in the standard. While this may mean that the mobile station fails registration and could be declared fraudulent, this is not necessarily the case, and it is presumed that a sufficient part of registration was done correctly to confirm with good probability that the mobile station is truly the mobile station identified, but that the mobile station is misbehaving. A mobile station may also fail repeatedly to perform according to an expected standard. For example, over a period of time, the mobile station may exhibit a consistently high Bit Error Rate (BER) Frame Erasure Rate (FER), and additionally, in the case of wireless communications, the problem is found in more than one cell. Likewise, failing to designate to a voice channel over a period of time, and failing to hand-off from voice channel to voice channel over a period of time are also examples of misbehavior, and additionally, in the case of cellular telephony, the misbehavior may be confirmed when found in more than one cell.

Errors which over time suggest misbehavior may also include problems experienced during call setup (e.g. call drops), air interface problems (e.g. the frequency offset may be too large, and/or the power adjustment may not be working properly resulting in too weak or too strong signals from the mobile station), hand-off oscillations, registration problems, and radio communications quality problems over time (e.g. low Signal Strength (SS) and speech problems in addition to high BER and FER).

Figure 1:
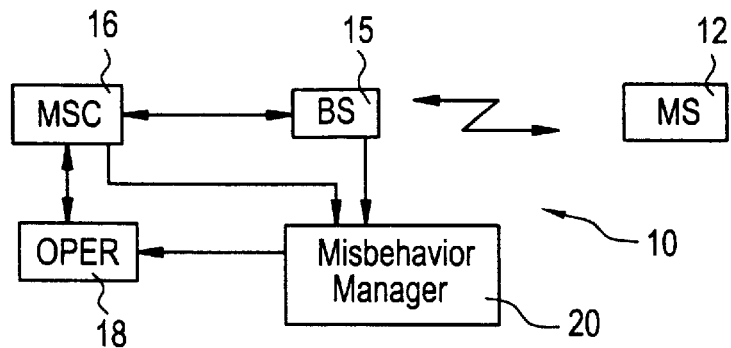
FIG. 1 shows a high level schematic block diagram of a wireless communication system incorporating the misbehaving mobile station identification system in accordance with the present invention.

In the preferred embodiment, the wireless communication system is a cellular wireless system 10 as those known in the art. The basic components of the system are illustrated in FIG. 1, in which there is shown a mobile station (MS) 12, a base station (BS) 15, a mobile switching center (MSC) 16, and an operator station 18. According to the invention, there is a misbehavior manager 20 associated with BS 15, MSC 16 and operator station 18. The misbehavior manager can be an independent node added to the wireless communication system 10, may be integrated into one of the existing nodes, such as for example the MSC 16 or the operator station 18, or can be partially integrated in a group of nodes while keeping an independent portion.

Figure 2:
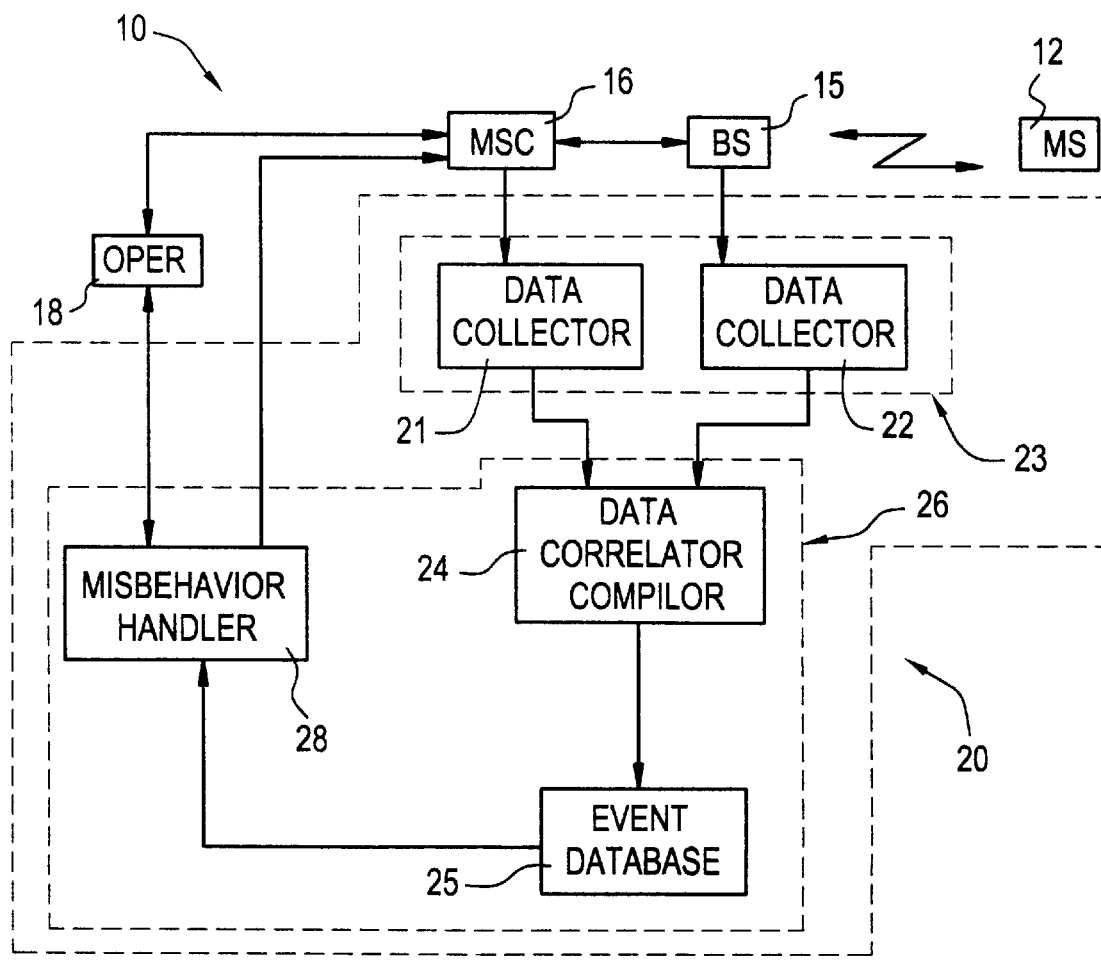
FIG. 2 is a more detailed block diagram of the misbehavior manager of FIG. 1.

As illustrated in greater detail in FIG. 2, the misbehavior manager 20 has two main modules: an error detection module 23 and an analyzing module 26. The error detection module 23 and the analyzing module 26 may consist of hardware or software, depending on the preferred implementation. More particularly, the error detection module 23 detects, from signals received from the mobile station 12, errors indicative of faulty operation of the mobile station, and generates error signals accordingly. For doing so, the error detection module 23 has, as shown for examplary purposes, two data collectors 21 and 22. As can be appreciated by those skilled in the art, the range of data collectors used may vary from one to several, depending on the degree of mobile station misbehavior identification which wants to be detected. In the example shown on FIG. 2, the data collector 22 collects data signals from the BS 15 and similarly data signals from the MSC 16 are collected by data collector 21. For example, data collector 22 may collect data on the air interface and radio quality such as BER/FER. The data collectors 21 and 22 generate, from the data signals received, error signals.

The analyzing module 26 receives and analyzes the error signals to determine whether the mobile station under consideration is misbehaving and to output a misbehaving identification signal which identifies the mobile station as misbehaving. For doing so, the analyzing module 26 has a data correlator/compilor 24, an event database 25 and a misbehavior handler 28. The data correlator/compiler 24 analyzes the data collected by the data collectors 21 and 22 to look for specific problems such as high BER/FER, hand-off problems, registration problems, etc. The data correlator/compiler 24 additionally determines whether the problem is recurrent or serious enough to warrant creating a misbehavior event record. Such misbehavior event records are recorded in the event database 25. The misbehavior handler 28 reads the misbehavior event records in the event database 25. When a particular mobile station is found to be misbehaving, either as a result of a single event or as a result of a series of related or unrelated misbehavior event records, the misbehavior handler 28 responds. For responding, the misbehavior handler 28 has a module for sending a shutdown command (not shown) and/or a mobile station notification module (not shown).

The response to misbehavior either involves sending a direct and immediate shutdown command message to the mobile station 12 by the module for sending a shutdown command, through the MSC 16 and BS 15, or sending a notification message either directly to the subscriber using the misbehaving mobile station by use of an SMS message for example, or to an operator 18 through the use of the mobile station notification module, thus providing periodical display of the misbehaving identification signal to the operator. Upon receipt of a notification message, the operator may choose to contact the subscriber using the misbehaving mobile station 12 to investigate a reason for the misbehavior or to recommend bringing the mobile station in to an authorized dealer or maintenance service provider. The operator 18 may be in part or wholly automated, thus involving sending text or voice messages to the mobile station 12 warning that misbehavior has been detected and that service is recommended. A human operator may intervene, possibly in response to a keypad initiated request by the subscriber, to provide advice on where to seek service. This is particularly useful when the subscriber is traveling in an unfamiliar city. If the notification message is sent directly to the mobile station, it may also include a misbehavior warning display command, to inform the subscriber of the misbehaving mobile station that the latter is malfunctioning.

Since a misbehaving mobile station 12 is still functional, a grace period may be allowed before shutting down the mobile station. The grace period allows the subscriber to bring in the mobile station for repairs or have the mobile station replaced before losing use of the mobile station as a result of a shutdown. When the misbehavior is serious, that is when it significantly affects network performance, a grace period is preferably not allowed, and the mobile station is simply shut down by sending a shutdown command message to the mobile station 12 by the module for sending a shutdown command.

A mobile station 12 may be shut down either by denying it access to the wireless communication network 10 or by including in the mobile station 12 a shutdowncontroller for disabling the mobile station 12 and preventing it from attempting to communicate with the wireless communication system. If a mobile station 12 has started to malfunction with respect to its power adjustment such that its signal strength is too high, it is advantageous to shutdown the mobile station immediately and prevent it from attempting communication.

Figure 3:
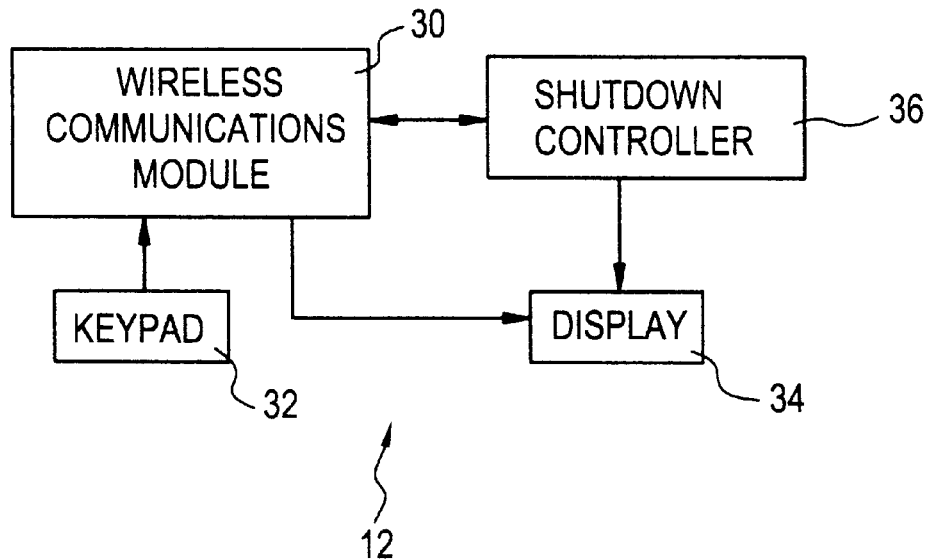
FIG. 3 is a block diagram of a mobile station according to the present invention.

As shown in FIG. 3, a mobile station 12 according to the preferred embodiment has a wireless communications module 30, a keypad 32 and a display 34. The wireless communications module 30 may consist for example, of a transmitter, an antenna and all other necessary components and software to allow the mobile station to communicate with the wireless communication system. The display 34 may have both an Liquid Crystal Display (LCD) as well as Light Eemitting Diode (LED) for indicating basic operational states of the mobile station 12. A shutdown controller 36 is included and connected with the wireless communications module 30 and the display 34. The shutdown controller responds to a shutdown command received from the MSC 16 through the BS 15 via the wireless communications module 30. The shutdown command is acted on by signaling the wireless communication module 30 to shutdown and by causing a service request message to be displayed on display 34. The message may be a text message such as "Mobile station misbehaving—Please bring to nearest authorized dealer for repair". Alternatively, a LED labeled on the mobile station housing with a "Service required" label may be caused to flash. The mobile station then becomes nonfunctional. The shutdown controller 36 also responds to a misbehavior warning signal received through the wireless communications module 30 from the MSC 16 which causes the display 34 to provide a warning message on display 34 without shutting down the mobile station 12. This warning message may be sent using the Short Message Services (SMS) facility of the IS-136Interface Standard for example.

The shutdown controller 36 includes a non-volatile memory so that the shutdown state of the mobile station is not defeatable by merely disconnecting the mobile station's battery. In the preferred embodiment, the non-volatile memory (EEPROM) must be reprogrammed to reset the shutdown state of the mobile station. Alternatively, a reset switch could be provided accessible to repair personnel inside a housing of the mobile station 12 as part of the shutdown controller 36 for resetting the shutdown state of the mobile station 12.

Figure 4:
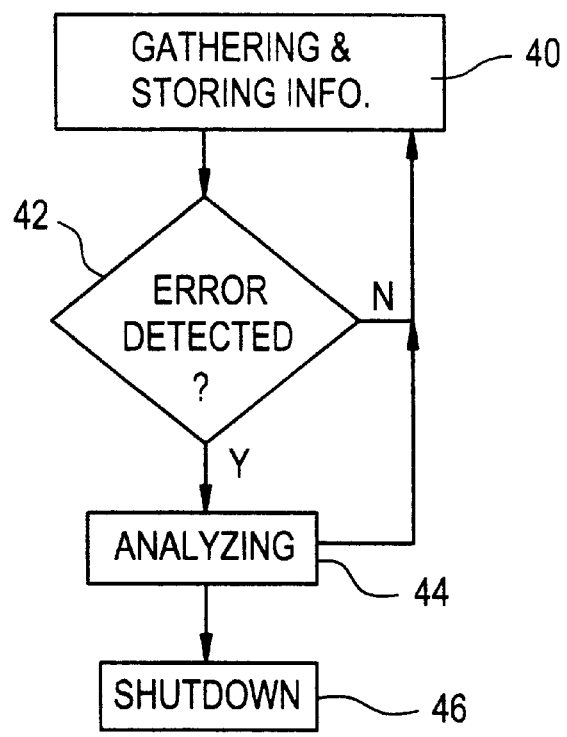
FIG. 4 is a flow diagram of a method for identifying a misbehaving mobile station in accordance with the present invention.

Referring now to FIG. 4, there is shown a flow diagram of a method for identifying a misbehaving mobile station in accordance with the present invention. The method starts with a step of gathering and storing 40 information about a functional quality of a mobile station in the wireless communications system 10. As previously discussed, the functional quality may consist of BER/FER, errors, non-respect of standards, etc. Then, at step 42, a determination is made as to whether from the information gathered and stored at step 40, one or several errors indicative of faulty operation of the mobile station have been detected, and if so, one or several error signals are generated. If a determination is made at step 42 that no error is detected, the method goes back to step 40. In step 44, an analysis is performed on the error signal(s) generated in step 42 to determine whether the mobile station is misbehaving, and if the mobile is misbehaving, it is then identified as misbehaving. If in step 44 the mobile station has been identified as misbehaving, the method follows to step 46 where the mobile station is shut down. If the mobile station is not identified as misbehaving, the method goes back to step 40.

Although the invention has been described above with reference to a preferred embodiment, it is to be understood that the above description is intended merely to illustrate the invention and not to limit the scope of the invention as defined in the appended claims.

What is claimed is:

1. In a wireless communication system, a misbehaving mobile station identification system comprising:

error detection means for detecting failure of a mobile station to adhere to communications standard defined messaging protocols for accessing the wireless communications system that are indicative of faulty operation of said mobile station and for generating error signals; and means for analyzing said error signals to determine whether said mobile station is misbehaving and to output a misbehaving identification signal identifying said mobile station as misbehaving if said mobile station is determined to be misbehaving.

2. The identification system as claimed in claim 1, further comprising operator notification means for providing an operator at least periodically with a display of said identification signal.

3. The identification system as claimed in claim 1, further comprising mobile station notification means for providing a subscriber using said mobile station with a message in response to said identification signal.

4. The identification system as claimed in claim 2, further comprising means for sending a shutdown command to said mobile station.

5. The identification system as claimed in claim 4, further comprising mobile station notification means for providing a subscriber using said mobile station with a message in response to an input from said operator, whereby an operator may forewarn said subscriber of an incoming shutdown command.

6. The identification system as claimed in claim 3, wherein said mobile station notification means further sends a misbehavior warning display command to said mobile station.

7. The identification system as claimed in claim 1, wherein said error detection means comprise data collector means associated with at least one base station and a mobile station switching center of said wireless communication system.

8. The identification system as claimed in claim 3, wherein said mobile notification means sends an SMS message to said mobile station.

9. A mobile station for use with a wireless communication system, said mobile station having a wireless communications module, a keypad and a display, said mobile station comprising:

means for accessing the wireless communication system preferably in accordance with certain communications standard defined messaging protocols; and a misbehavior shutdown controller for shutting down said mobile station in response to a shutdown command received from said wireless communication system, the shutdown command indicative of wireless communication system detection of mobile station failure to adhere to the certain communications standard defined messaging protocols while making accesses.

10. The mobile station as claimed in claim 9, wherein said misbehavior shutdown controller causes said display to indicate a misbehavior warning message in response to a warning command signal received from said wireless communication system.

11. The mobile station as claimed in claim 9, wherein said misbehavior shutdown controller causes said display to display a service required message in response to a shutdown command received from said wireless communications system.

12. In a wireless communication system, a method of identifying a misbehaving mobile station, said method comprising the steps of:

gathering and storing information about mobile station messages sent to said wireless communication system in connection with making accesses to the wireless communication system;

detecting, from said information, failure of the mobile station to adhere to communications standard defined messaging protocols for accessing the wireless communications system that are indicative of faulty operation of said mobile station and generating error signals; and analyzing said error signals to determine whether said mobile station is misbehaving and identifying said mobile station as misbehaving if said mobile station is determined to be misbehaving.

13. The method as claimed in claim 12, further comprising a step of shutting down said mobile station when identified as misbehaving.

14. In a wireless communication system, a misbehaving mobile station detection system comprising:

error detection means for detecting errors indicative of mobile station failure to adhere to communications standard defined messaging protocols for accessing the wireless communications system and for generating error signals; and means for analyzing said error signals to determine whether said mobile station is misbehaving due to its disregard of the communications standard defined messaging protocols for system access and to output a misbehaving identification signal identifying said mobile station as misbehaving if said mobile station is determined to be misbehaving.

15. The control system as claimed in claim 14, further comprising operator notification means for providing an operator at least periodically with a display of said misbehaving identification signal.

16. The control system as claimed in claim 14, further comprising mobile station notification means for providing a subscriber using said mobile station with a message in response to said misbehaving identification signal.

17. The control system as claimed in claim 14, further comprising mobile station notification means for providing a subscriber using said mobile station with a message in response to an input from said operator, whereby an operator may forewarn said subscriber of a potential shutdown of the mobile station.

18. The identification system as claimed in claim 17, wherein said mobile station notification means further sends a misbehavior warning display command to said mobile station.

19. The identification system as claimed in claim 17, wherein said mobile station notification means sends an SMS message to said mobile station.

20. The identification system as claimed in claim 14, wherein said error detection means comprise data collector means associated with at least one base station and a mobile station switching center of said wireless communication system.

21. The identification system as claimed in claim 14, wherein the messaging protocols for system access relate to mobile station accessing the system for registration.

22. The identification system as claimed in claim 14, wherein the messaging protocols for system access relate to mobile station hand-off from cell to cell.

23. A method of identifying a misbehaving mobile station, said method comprising the steps of:
  gathering information about mobile station adherence to communications standard defined messaging protocols for accessing a wireless communication system;
  detecting, from said information, errors indicative of mobile station failure to adhere to communications standard defined messaging protocols for system access and generating error signals;
  analyzing said error signals to determine whether said mobile station is misbehaving due to its disregard of the communications standard defined messaging protocols for system access; and
  generating a misbehaving identification signal identifying said mobile station as misbehaving if said mobile station is determined to be misbehaving.

24. The method as claimed in claim 23, wherein the messaging protocols for system access relate to mobile station accessing the system for registration.

* * * * *